May 13, 1969 KAZUTAMI HAYASHI 3,443,914

COMPOSITE METAL WIRE WITH A BASE OF IRON OR NICKEL AND AN OUTER COAT OF PALLADIUM

Filed July 25, 1966 Sheet 1 of 2

INVENTOR.
KAZUTAMI HAYASHI

BY

Ostrolenk, Faber, Gerb + Soffen
ATTORNEYS

INVENTOR.
KAZUTAMI HAYASHI
BY
Ostrolenk, Faber, Gerb + Soffen
ATTORNEYS

United States Patent Office 3,443,914

Patented May 13, 1969

3,443,914

COMPOSITE METAL WIRE WITH A BASE OF IRON OR NICKEL AND AN OUTER COAT OF PALLADIUM

Kazutami Hayashi, Tokyo, Japan, assignor to Nippon Electric Company Limited, Tokyo, Japan Filed July 25, 1966, Ser. No. 567,435
Claims priority, application Japan, July 31, 1965, 40/46,470
Int. Cl. B32b *17/06;* H01j *5/26*
U.S. Cl. 29—183.5 1 Claim

ABSTRACT OF THE DISCLOSURE

A composite metal material comprised of a wire of iron-nickel alloy or iron, an intermediate coating of a material taken from the group consisting of tin, copper, silver and gold, and an exterior coating of palladium to provide for good metal-to-glass seals to have the characteristic of low resistivity and to substantially equate the thermal expansion of the metallic composition to the glass or ceramic material is bonded thereto.

Figure 1:
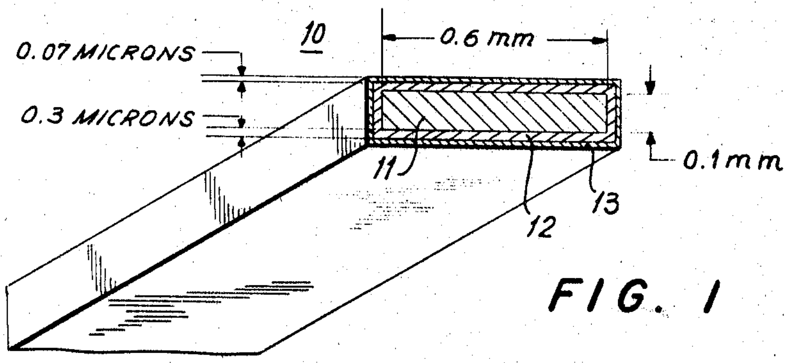

The instant invention relates to composite metallic materials which are sealed in glass and/or brazed to ceramics and/or metallic or semiconductor materials and more particularly to a composite metallic material comprising a core of an iron-nickel alloy or iron, an intermediate coating of a material taken from the group consisting of tin, copper, silver and gold, and a surface coating of palladium.

There exists many applications in which metallic materials are employed for sealing and/or brazing purposes. For example, in the semiconductor and vacuum tube fields it is conventional to provide conductive leads which are brazed or soldered to a semiconductor material which is then sealed in glass or some other suitable ceramic so that the conductive lead protrudes from the housing of glass or ceramic material for the purpose of electrically connecting the semiconductor device to an electrical circuit. Similarly in the vacuum tube field conductive leads are soldered or brazed to the cathode grid and anode electrodes, for example, and the structure is then hermetically sealed in a glass envelope such that the conductive leads protrude from the envelope for the purpose of coupling the vacuum tube to an electrical circuit.

It becomes very important to judiciously select suitable conductive leads in order to provide an excellent seal in the region where surface contact is made between the conductive lead and the glass or other ceramic; to be assured that the conductive leads have low resistivity; and also to be assured that the coefficient of thermal expansion as between the leads and the glass or ceramic which makes surface contact with the conductive leads are substantially equal to one another to insure an excellent seal therebetween over substantially long periods of time and preferably indefinitely.

Generally, the coefficient of thermal expansion of a metallic material to be sealed in glass must agree in value with that of the glass employed. Inasmuch as there are a variety of glass materials and their coefficients of thermal expansion assume values over a wide range, metallic materials to be sealed in different sorts of glass must, accordingly, have differing respective thermal expansion coefficients to be compatible with the glass material used.

It is well known to employ an iron-nickel alloy as a sealing material, because it is easy to adjust the coefficient of thermal expansion by varying the percentage of the constituents in the composition. On the other hand, iron, per se, has a substantially constant coefficient of thermal expansion, but is very often used as the sealing material by making a judicious choice of a suitable sealing glass because iron, per se, is far cheaper than the iron-nickel alloy.

However, both iron and the iron-nickel alloy have relatively large electrical resistivity and it is also difficult to provide a metal oxide coating on their surfaces, which coating is compact enough and is sufficiently tenaciously sealable to afford a perfect metal-to-glass seal. Furthermore, the above materials, when sealed in a glass containing lead oxide as an ingredient, reduce the lead oxide and deposit metal lead along the interface of the seal which severely damages the air-tightness of the seal.

In order to remove such defects it has been conventional to provide a material to be sealed comprising a core of an iron-nickel alloy or iron, per se, and a coating of copper or silver, which has small electrical resistivity and which enables an air-tight seal to be obtained. The copper coating, however, is easily oxidized into cupric oxide (CuO), with the result that air-tightness cannot be achieved unless the material is sealed in glass, by first removing the oxide coating and by subsequently newly forming a fresh cuprous oxide ($Cu_2O$) coating. On the other hand, a material covered with silver, when treated in air or in a slight oxidizing atmosphere to obtain a tenacious seal in glass, experiences undesired oxidation at the interface portion between the silver and the core material due to the penetration of oxygen into the silver coating so as to cause deterioration of the surface contact between he core material and the silver coaing. As a result, not only is the air-tightness of very poor quality, but also very poor results of soldering and/or brazing are achieved by the sealed material. This is due to the fact that the solder or brazing material easily and readily dissolves the silver coating and eventually comes into direct contact with the oxidized surface of the core material. Furthermore, the silver coating, when left in an atmosphere of high humidity or particularly in an atmosphere containing a sulfur compound, easily and rapidly undergoes a change in color and corrosion at the surface, resulting in the disadvantages of producing an extreme amount of difficulty in the performance of soldering and/or brazing operations, a large deterioration of electrical conductivity and a very unfavorable appearance.

The instant invention is characterized by providing a material which removes the above mentioned defects and yet provides a cheap comopsite metallic material which can be reliably sealed in glass and/or brazed to metal and/or ceramics.

The instant invention is a composite material comprised of a tape-like, wire-like, or plate-like core of an iron-nickel alloy or iron, per se, having a first or intermediate coating of a metallic material taken from the group consisting of tin, copper, silver and gold and having a thickness of between 0.01 micron and 5.0 microns, and having a second or surface coating of palladium of a thickness in the range between 0.01 and 2.0 microns. The above composite material has been found to be easily sealed in glass, easily soldered or brazed to ceramics and/or metals, and further suffers very little from corrosion. Further experimentation showed that a core material of iron-nickel alloy or iron, per se, having a directly applied coating of palladium was found to be a very poor seal material due to the poor contact affinity between the core material and the palladium coating.

Palladium has been found to give the best results for the reason that palladium, belonging to the platinum group of the periodic table of chemical elements, has properties quite similar to platinum and consequently is suitable for sealing in glass. These advantages have also been found to result even when the palladium is in the form of a very thin film. The coating has also been found to provide extremely reliable soldering or brazing and has such a high stability that it has been found to serve as an excellent protective coating or surface against rust and thereby acts as a reliable anti-corrosive, even in an atmosphere of high humidity.

Exhaustive experimentation has shown that the intermediate coating of a material taken from the group consisting of tin, copper, silver, or gold should have a thickness in the range between 0.01 and 5.0 microns. These ranges were arrived at for the following reasons.

It has been found to be impossible to provide a surface layer of palladium upon an intermediate coating having a thickness of less than 0.01 microns, which palladium surface coating will cling tenaciously to the intermediate coating. Thus, the air-tightness, soldering and brazing characteristic of the material are extremely poor when the intermediate coating is less than 0.01 micron.

In the case where the intermediate coating is made thicker than 5.0 microns, no better results were found to occur than those that were obtained with an intermediate coating lying within the preferred range and, in addition, the composite material, when sealed in glass has been found to produce foaming and flaking in the region of the seal and has been found to cause superfluous overflow of the solder or brazing agent, as well as generation of boss-like protrusions as a result of the soldering or brazing operations. In addition to the above, a coating of silver or gold of more than 5 microns thickness is further objectionable from the economic point of view due to the preciousness of such metals.

The reasons why the palladium surface thickness has been limited to the range between 0.01 and 2.0 microns are as follows.

A palladium coating thinner than 0.01 micron has been found to give poor end results, provide imperfect sealing, soldering and brazing and is not capable of serving as a protective surface against rust and corrosion. A palladium coating having a thickness greater than 2.0 microns has been found to yield no better sealing, soldering and brazing results than surface coatings of lesser thickness and therefore is not preferable from an economical consideration due to the preciousness of palladium.

A variety of methods have been found to be very successful in the forming of such composite metallic materials. For example, tin, copper, silver, gold and palladium may be applied by electrical or chemical plating operations, vacuum evaporation, or may be formed into a film attached in film form to the core under some pressure and then subjected to a rolling-pulling or extruding operation. In addition, any combination of these methods may be employed to produce the composite structure. Furthermore, it is possible to sinter the layers of such metals when or before performing sealing, soldering or brazing operations.

It is therefore one object of the instant invention to provide a novel composite material which is extremely advantageous for use in the electrical circuits field for sintering, brazing and sealing operations.

Another object of the instant invention is to provide a novel composite material comprised of a metallic core, an intermediate layer of a material taken from the group consisting of tin, copper, silver and gold, and an exterior or surface layer of palladium.

Another object of the instant invention is to provide a novel composite material comprised of a metallic core, an intermediate layer of a material taken from the group consisting of tin, copper, silver and gold, and an exterior or surface layer of palladium wherein the thickness of the intermediate layer is in the range from 0.01 to 5.0 microns.

Still another object of the instant invention is to provide a novel composite material comprised of a metallic core, an intermediate layer of a material taken from the group consisting of tin, copper, silver and gold, and an exterior or surface layer of palladium wherein the thickness of the intermediate layer is in the range from 0.01 to 5.0 microns and wherein the surface layer is of a thickness in the range from 0.01 to 2.0 microns.

These and other objects of the instant invention will become apparent when reading the accompanying description and drawings in which:

FIGURE 1 is a perspective view showing a composite metallic structure designed in accordance with the principles of the instant invention.

Figure 1A:
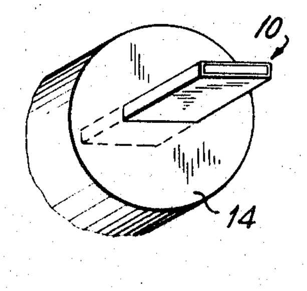

FIGURE 1*a* is a perspective view showing the structure of FIGURE 1 forming a seal with a glass envelope, only a portion of which is shown.

Figure 2:
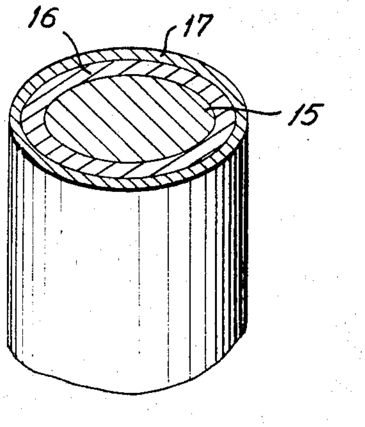

FIGURE 2 is a perspective view showing an alternative arrangement for the embodiment of FIGURE 1.

Figures 3A, 3B, 3C:
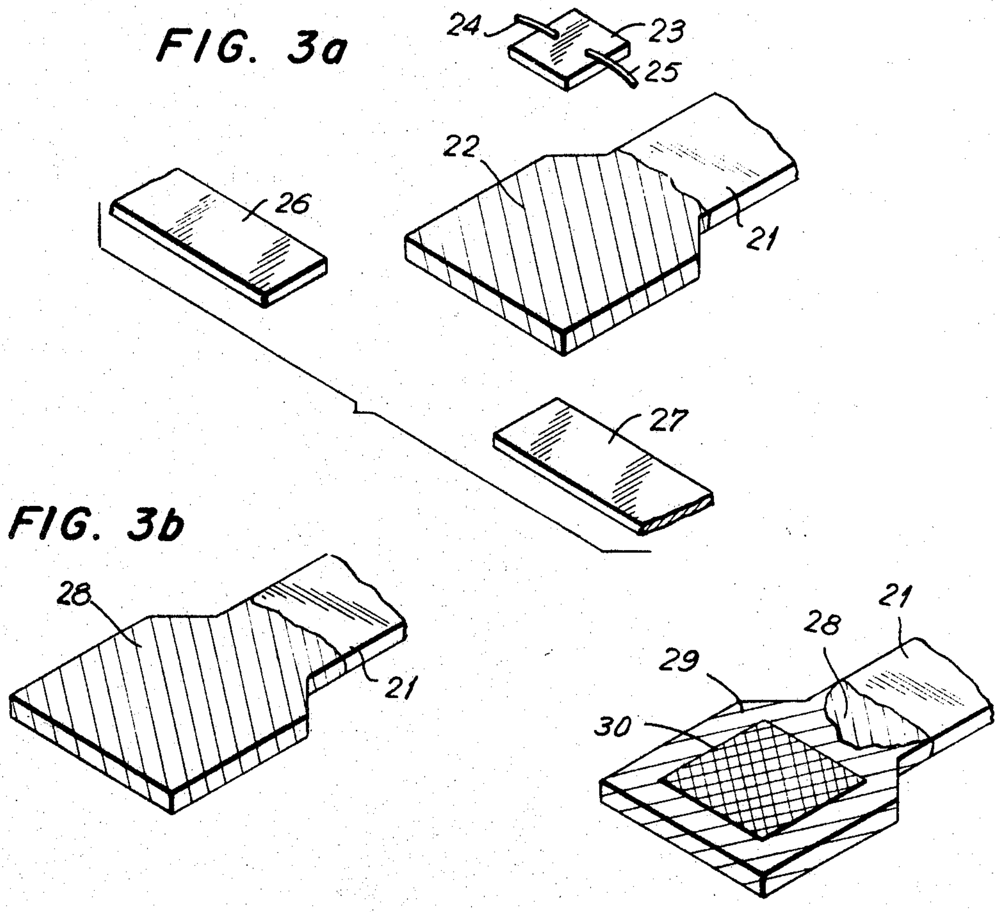

FIGURE 3*a* is a perspective view showing a prior art semiconductor assembly.

Figure 3D:
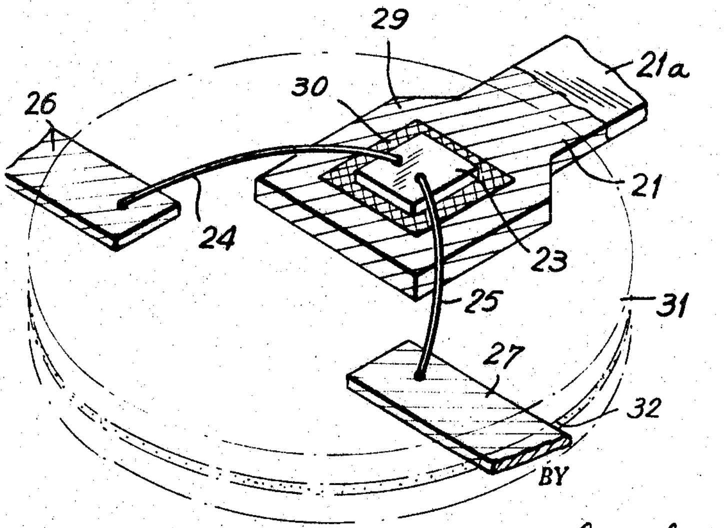

FIGURES 3*b* through 3*d* are perspective views showing the manner in which the instant invention is employed in assemblies of the type shown in FIGURE 3*a*.

The instant invention will now be explained in conjunction with some specific examples.

*Example 1*

An iron-nickel alloy containing 52% nickel was shaped into a tape-like form, 11, as shown in the composite structure, 10, of FIGURE 1. The thickness of the tape-like structure was 0.10 mm. and the width was 0.60 mm. An intermediate layer of copper, 12, was strike plated upon the tape-like member 11 to provide a copper coating having a thickness of 0.30 micron so as to provide a minimum number of pinholes. The resulting structure was then subjected to a plating operation in which palladium, 13, was plated to cover the copper surface with a coating having a thickness of 0.070 micron. The resulting structure was then subjected to sintering at a temperature of the order of 750° C. for a period of ten minutes, in atmosphere of hydrogen.

The composite structure 10 was then sealed in an atmosphere of air into a lead-oxide glass envelope, only a portion of which, 14, is shown in FIGURE 1*a*. The glass contained 75% $PbO$, 11% $B_2O_3$, 3% $SiO_2$ and 11% $Al_2O_3$ The resulting structure provided an evtremely reliable hermetic seal and no deposition of metal lead was found to occur along the interface of the seal between the glass and the composite metallic structure. The composite material, after having been sealed in glass was dipped for approximately one minute into a bath of molten solder which was an eutectoid of 40% lead and 60% tin. The resulting soldering was found to provide excellent cohesion. Furthermore, the composite material was subjected to brazing with silver solder consisting of 72% silver and 28% copper which likewise gave excellent results.

In addition, the resulting metallic structure 10 was found to have an electrical resistivity 20% smaller than that of a plain core of iron-nickel alloy.

*Example 2*

Cores of iron-nickel allow were processed in the same manner as set forth in Example 1, except that silver was electroplated upon the core to form an intermediate layer having a thickness of 0.10 micron. In addition, gold was chemically plated upon similar additional cores of iron-nickel alloy forming a layer having a thickness of up to 0.03 micron. The iron-nickel alloy cores having a silver intermediate layer were then plated with a surface layer of palladium having a thickness of up to 0.50 micron. The iron-nickel alloy cores having a gold intermediate layer were then plated with a surface layer of palladium having a thickness of 1.0 micron. These composite materials were then sealed in an atmosphere of air in a glass envelope containing lead oxide. None of the resulting structures were found to deposit metal lead at the interface portion and all provided excellent hermetic seals. The silver-clad materials, after having been sealed in glass did not undergo any oxidation at the surface portion of the iron-nickel core. All of the above samples, after being sealed in glass, were subjected to soldering with solder consisting of 35.5% lead, 61.5% tin and 3% silver, resulting in soldering of excellent cohesion.

The materials were then brazed in an atmosphere of hydrogen at a temperature in the range from 700° C–730° C., to the metallized surface of a forsterite ceramic with a brazing material consisting of 61% silver, 24% copper and 15% indium. The brazing was found to be extremely air-tight and extremely tenacious.

*Example 3*

An iron core was formed into a wire, 15, as shown in the embodiment of FIGURE 2 and having a diameter of 0.60 mm. The wire-shaped core was then subjected to electroplating of silver forming a layer 16 of thickness of the order of 1.50 microns. The resulting structure was then sintered at 770° C. in an atmosphere of hydrogen for approximately ten minutes. The sintered silver-clad iron wire was then subjected to electroplating of palladium causing the silver coating to be clad by a coating 17 of palladium having a thickness of 1.0 micron. The resulting material was then heat-treated at 700° C. in a hydrogen atmosphere for approximately five minutes.

The composite structure was then sealed in glass of a type compatible with iron. The sealing operation resulted in an excellent hermetic seal which was free of any foaming.

The material sealed in glass was then soldered with the solder consisting of 67% lead and 33% tin. No defects whatsoever were found and the soldering operation yielded tenacious cohesion.

The electrical resistivity of the composite material was found to be better than 15% less than the electrical resistivity of a plain iron-nickel alloy core.

*Example 4*

FIGURE 3*a* shows the manner in which the header generally employed in semiconductor devices is normally treated.

In the fabrication of semiconductor devices it is typical to provide a header 21 which is gold plated over the hatched region 22 to form a layer having a thickness in the range between 2.0 and 5.0 microns. The gold layer facilitates brazing of a semiconductor element 23 thereto. Subsequent thereto, as is conventional in semiconductor fabrication, gold wires or other suitable leads 24 and 25 are electrically connected to electrode leads 26 and 27, respectively.

However, in the instant invention the header 21 was first tin-plated in the region represented by the hatched lines 28 so as to form a layer having a thickness of 2.0 microns over the entire header or at the minimum upon the header and the under-surface of the semiconductor ment is to be brazed.

As shown in FIGURE 3*c* the intermediate layer of tin was further coated with a surface layer of palladium as represented by the hatched lines 29. The surface coating had a thickness of the order of 0.20 micron.

A small amount of gold foil or a gold granule was placed at 30 upon the surface of the palladium for use as a brazing material between the palladium surface of the header and the under-surface of the semiconductor device to be brazed. The assembly was then heated up to a temperature of the order of 380° C. It was found that the semiconductor element readily adhered to the header and was tenaciously brazed thereto. FIGURE 3*d* shows the semiconductor device 23 mounted upon the area 30 of header 29. Furthermore, it was found that an electrical lead (not shown) soldered to the header portion extruding from the sealing envelope 31 provided an excellent and highly tenacious solder joint when the protruding portion 21*a* of the header was clad with tin and palladium in the same manner as was previously described. The resulting structure was found to yield excellent protection against rust and corrosion. FIGURE 3*d* shows the manner in which one lead, 27, protrudes from the envelope 31 and hence forms an interface with the glass seal 32. An excellent hermetic seal was found to exist.

The identical assembly was also formed with the exception that silver was substituted for tin and similar outstanding results were also found to occur.

Thus, the header was by no means inferior to the conventional gold-clad headers as regards its ability to be brazed to semiconductor elements and to be soldered to external leads. In addition thereto, the ability to fight rust and corrosion were found to be so superior to conventional gold clad headers.

It can therefore be seen that the instant invention provides an extremely advantageous composite metallic structure which is especially useful in electric circuitry due to its excellent brazing and soldering characteristic, as well as providing an excellent seal at an interface between the composite structure surface and the surface of the sealing material.

Although there has been described a preferred embodiment of this novel invention, many variations and modifications will now be apparent to those skilled in the art. Therefore, this invention is to be limited, not by the specific disclosure herein, but only by the appending claim.

What is claimed is:

1. A composite metallic material useful in brazing, soldering and sealing applications being comprised of a wire formed of a material taken from the group consisting of iron and iron-nickel alloy;

an intermediate layer comprised of a coating of a material taken from the group consisting of tin, copper, silver and gold, bonded metallurgically upon the wire;

and an exterior coating of palladium being deposited upon said intermediate layer, the thickness of said exterior coating being in the range of from 0.01 to 2.0 microns.

References Cited

UNITED STATES PATENTS

| | | | |
|---|---|---|---|
| 2,135,886 | 11/1938 | Elder | 29—195 |
| 2,301,320 | 11/1942 | Phillips. | |
| 2,317,350 | 4/1943 | Adler. | |
| 2,508,465 | 5/1950 | Offinger | 29—196 X |
| 3,122,424 | 2/1964 | King | 29—195 |
| 3,162,512 | 12/1964 | Robinson | 29—194 X |
| 3,282,660 | 11/1966 | Pendleton | 29—196.3 X |

HYLAND BIZOT, *Primary Examiner.*

U.S. Cl. X.R.

29—196.3, 199